J. J. MOUAWAD.
AUTOMATIC MATCH BOX.
APPLICATION FILED FEB. 19, 1916.
1,245,945.
Patented Nov. 6, 1917.
Fig. 1.
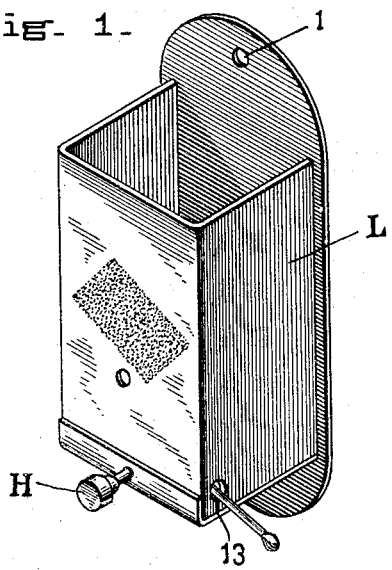
Fig. 2.
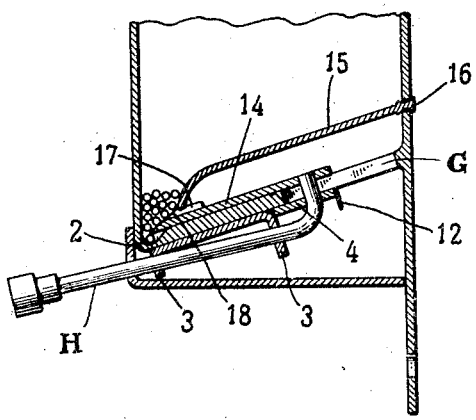
Fig. 3.
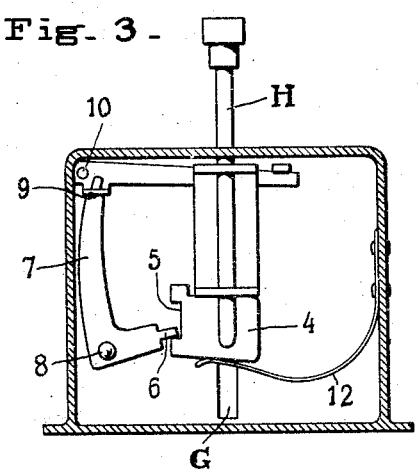
Fig. 4.
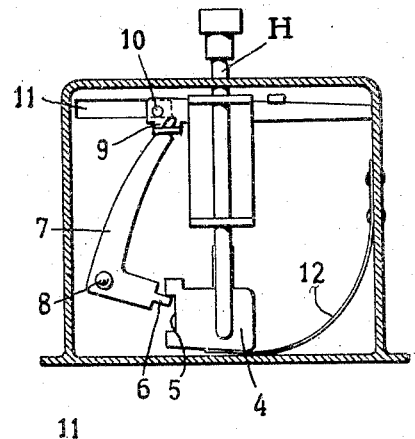
Fig. 5.
WITNESSES
INVENTOR
J. J. Mouawad
BY
ATTORNEY

UNITED STATES PATENT OFFICE.

JOHN J. MOUAWAD, OF NEWARK, NEW JERSEY.

AUTOMATIC MATCH-BOX.

1,245,945. Specification of Letters Patent. Patented Nov. 6, 1917.

Application filed February 19, 1916. Serial No. 79,345.

*To all whom it may concern:*

Be it known that I, JOHN J. MOUAWAD, residing at Newark, in the county of Essex and State of New Jersey, have invented certain new and useful Improvements in Automatic Match-Boxes, of which the following is a specification.

This invention relates to a device for containing and delivering matches or the like. The particular object of the invention is to provide a simple, practical, efficient and attractive device for this purpose and to arrange the mechanism thereof so as to deliver preferably a single match or the like at each operation thereof.

A further and more detailed object is to provide a suitable container for the matches and to provide a push-rod or the like and mechanism associated therewith for engaging and delivering from the container preferably a single match at each operation of the push-rod.

Other objects and aims of the invention, more or less specific than those referred to above, will be in part obvious and in part pointed out in the course of the following description of the elements, combinations, arrangements of parts and applications of principles, constituting the invention; and the scope of protection contemplated will be indicated in the appended claims.

In the accompanying drawings which are to be taken as a part of this specification, and in which I have shown a merely preferred form of embodiment of the invention:

Figure 1 is a perspective view of a device constructed in accordance with the provisions of this invention.

Fig. 2 is an enlarged vertical central sectional view through the lower portion of the device for illustrating the details of construction of the delivering mechanism.

Fig. 3 is a bottom plan view of the device, the bottom guard wall thereof being removed so as to disclose the delivering mechanism, and the delivering mechanism being illustrated in its normal position.

Fig. 4 is a view similar to that shown in Fig. 3 but the delivering mechanism being shown in its delivering position; and Fig. 5 is a top plan view of the device illustrating the single match therein in the act of being delivered.

Referring to the drawings for a detailed description of the structure illustrated, the reference character L indicates a rectangular box or casing within which the matches or the like are contained. The rear vertical wall is preferably enlarged slightly as illustrated and provided with a suitable aperture 1 by means of which the device may be conveniently supported. The bottom wall, as G, is preferably arranged at an incline from the horizontal so as to be lower adjacent its front edge than at its rear edge, and the forward edge is formed with a transverse groove or pocket 2 adjacent the front wall of the casing into which the matches or the like within the casing fall by gravity.

The delivery mechanism is arranged beneath the lower wall G and comprises the push-rod H supported slidably in suitable bearings 3 fixed to the bottom wall. The inner end is connected to a slide plate 4 arranged beneath the bottom wall G and said slide plate is provided with a slot 5 therein within which the short arm, as 6, of a bell crank lever 7 engages. The bell crank lever is pivotally mounted upon the lower face of the bottom wall G by means of a pivot pin 8 and its other or longer arm pivotally engages an ejector plate 9 slidable transversely beneath the bottom wall G directly below the pocket 2. An ejector pin 10 extends from the ejector plate through a slot 11, formed in the bottom wall G, into the pocket 2.

A suitable spring 12 is arranged for forcing the plunger rod H outwardly and for incidentally maintaining the ejector plate and pin in a normal position wherein the pin is at one extreme end of the pocket 2 and in a position to engage the end of a match or the like resting in said pocket.

The side wall of the casing adjacent the opposite end of the pocket is provided with an aperture 13 through which the match may be readily ejected when the ejector pin is moved forward along the slot 11.

Pressure upon the plunger rod H forces back the spring 12 and swings the bell crank so as to move the ejector pin forward.

It will, of course, be understood that the pocket 2 is preferably of such a size as to contain only a single match at any one time.

In order to insure that only a single match, or any given desired number of matches, shall be contained within the pocket 2, subject to the ejecting operation of the ejector pin at any one time, a guard plate 14 is arranged upon the inner surface of the bottom wall G and is connected to the inner end of the push-rod H so as to be moved thereby. When the push-rod is in its normal position the guard plate projects partially over the pocket 2 so as to divide the same more or less from communication with the remainder of the interior of the casing. Any matches or the like within the casing which it is not desired shall be ejected at a given operation of the ejector pin are supported upon the over-hanging portion of the guard plate.

Incidentally the guard plate serves as a stirrer or agitator for insuring that the matches are properly disposed within the pocket.

A false bottom 15 is preferably arranged within the casing above the guard plate and this false bottom terminates short of the front wall of the casing and the front edge thereof is bent downwardly toward the pocket 2. By this means the matches are fed more directly into the pocket.

If desired a suitable degree of lost motion may be provided between the operation of the plunger rod and the operation of the bell crank lever and ejector plate. This may be arranged so as to provide for a movement of the ejector pin prior to any movement of the guard plate or it may be arranged so as to provide for a movement of the guard plate prior to any movement of the ejector pin. In the instance illustrated, lost motion is provided for permitting movement of the guard plate prior to movement of the ejector pin, and as a means for effecting this lost motion the slot 5 for engaging the short end of the bell crank is elongated so that the slide plate 4, and with it the guard plate 14, will move an appreciable distance before imparting any movement to the bell crank.

The false bottom 15 is preferably attached to the casing only by its rear edge as at 16 and the attachment is a loose one so that the forward edge is free to move up and down, the attachment at the rear edge constituting in effect a pivotal support. The forward edge rests upon the upper surface of the guard plate and each time the guard plate is moved rearwardly from beneath the forward edge of the false bottom, said forward edge drops into direct engagement with the upper surface of the bottom wall G. By this means the false bottom becomes in effect an agitator. In order to increase the amount of movement and thereby the effectiveness of this feature of operation the forward edge of the guard plate may be provided with a raised portion 17 so as to define a decided cam surface 18 at the forward edge of the guard plate for operating the false bottom. Obviously as the guard plate moves forwardly to its normal position the false bottom is forced upwardly again.

As many changes could be made in this construction without departing from the scope of the following claims, it is intended that all matter contained in the above description or shown in the accompanying drawing shall be interpreted as illustrative only and not in a limiting sense.

Having thus described my invention what I claim as new and desire to secure by Letters Patent is:

1. A device of the class described, comprising a casing adapted to receive a plurality of matches or the like, said casing having a pocket formed therein for receiving one or more matches to be ejected from the casing, ejector means, a movable guard member for the contents of the pocket, drive means for moving said guard member, and an agitator operable by the movement of said guard member.

2. A device of the class described, comprising a casing adapted to receive a plurality of matches or the like, said casing having a pocket formed therein for receiving one or more matches to be ejected from the casing, ejector means, a movable guard member for the contents of the pocket, drive means for moving said guard member, a cam surface provided upon said guard member, and an agitator engaging said cam surface to be operated thereby.

In testimony whereof I affix my signature in the presence of two witnesses.

JOHN J. MOUAWAD.

Witnesses:
MICHAEL MURANO,
JAMES ABOARAB.

Copies of this patent may be obtained for five cents each, by addressing the "Commissioner of Patents, Washington, D. C."